US012364986B2

(12) United States Patent
Bagnato

(10) Patent No.: US 12,364,986 B2
(45) Date of Patent: Jul. 22, 2025

(54) PRODUCING A REAGENT ON-BOARD AN INSTRUMENT

(71) Applicant: LEICA BIOSYSTEMS MELBOURNE PTY LTD, Mount Waverly (AU)

(72) Inventor: Stephen John Bagnato, Mt. Waverley (AU)

(73) Assignee: LEICA BIOSYSTEMS MELBOURNE PTY LTD, Mount Waverly (AU)

( * ) Notice: Subject to any disclaimer, the term of this patent is extended or adjusted under 35 U.S.C. 154(b) by 0 days.

(21) Appl. No.: 18/661,552

(22) Filed: May 10, 2024

(65) Prior Publication Data

US 2024/0293820 A1 Sep. 5, 2024

Related U.S. Application Data

(63) Continuation of application No. 17/066,094, filed on Oct. 8, 2020, now abandoned, which is a continuation-in-part of application No. 14/653,956, filed as application No. PCT/AU2013/001499 on Dec. 20, 2013, now abandoned.

(60) Provisional application No. 61/745,331, filed on Dec. 21, 2012.

(51) Int. Cl.
*B01L 3/00* (2006.01)

(52) U.S. Cl.
CPC ............. *B01L 3/52* (2013.01); *B01L 2200/06* (2013.01); *B01L 2200/0689* (2013.01); *B01L 2200/16* (2013.01); *B01L 2300/0867* (2013.01)

(58) Field of Classification Search
None
See application file for complete search history.

(56) References Cited

U.S. PATENT DOCUMENTS 3,819,270 A * 6/1974 Hirschfeld ............... G01N 1/38 356/343
3,955,930 A * 5/1976 Shapiro .................... G01N 1/38 422/50
4,044,757 A * 8/1977 McWhorter ........ A61M 5/1456 604/82
4,129,381 A * 12/1978 Wied ..................... G05D 21/02 250/575
4,231,990 A 11/1980 Jottier
(Continued)

FOREIGN PATENT DOCUMENTS

WO 2012006185 A1 1/2012

OTHER PUBLICATIONS

Communication dated Jul. 26, 2016 from the European Patent Office in counterpart European Application No. 13865320.9.
(Continued)

*Primary Examiner* — Brian R Gordon
(74) *Attorney, Agent, or Firm* — Kinney & Lange, P.A.

(57) ABSTRACT

The present invention relates broadly to production of a reagent on-board an instrument. The instrument is provided with a probe for dispensing said reagent, a concentrate chamber adapted to contain a concentrate and a diluent chamber adapted to contain a diluent. The probe includes an in-line mixing chamber adapted to receive the concentrate and the diluent to provide the reagent at the required concentration for dispensing by the probe.

14 Claims, 7 Drawing Sheets

(56) References Cited

U.S. PATENT DOCUMENTS 4,747,685 A * 5/1988 Suzuki ............... G01N 33/5302
435/34
4,794,806 A * 1/1989 Nicoli .................. G05D 11/132
250/576
4,868,129 A 9/1989 Gibbons et al.
4,997,768 A 3/1991 Uffenheimer et al.
5,073,505 A 12/1991 Nalette et al.
5,076,472 A * 12/1991 Gross ........................ A61L 2/18
222/394
5,077,017 A * 12/1991 Gorin ....................... G01N 1/38
422/514
5,116,315 A * 5/1992 Capozzi ................ B05B 1/3436
604/82
5,861,124 A * 1/1999 Hosoi ...................... C12Q 1/68
422/50
5,882,599 A 3/1999 Gilbert
6,211,956 B1 4/2001 Nicoli
6,360,595 B1 3/2002 Lin et al.
6,613,286 B2 9/2003 Braun et al.
6,746,851 B1 6/2004 Tseung et al.
7,055,540 B2 6/2006 Oka et al.
7,718,435 B1 5/2010 Bogen et al.
7,832,293 B2 11/2010 Hermet et al.
7,998,434 B2 * 8/2011 Shaw ....................... G01N 1/38
422/514
8,142,739 B2 3/2012 Tseung et al.
8,173,068 B2 * 5/2012 Loeffler ................. G01N 1/312
422/68.1
8,348,971 B2 * 1/2013 Khanna .............. A61B 17/0057
606/232
8,480,651 B2 * 7/2013 Abuzaina ......... A61B 17/00491
604/113
8,932,543 B2 1/2015 Bui et al.
9,247,931 B2 * 2/2016 Belcheva .............. A61L 31/041
10,228,382 B2 3/2019 Dockrill et al.
11,561,234 B2 * 1/2023 Barbero-Ortega ..... G01N 35/10
2004/0033554 A1 2/2004 Powers
2004/0037739 A1 2/2004 Mcneely et al.
2004/0182788 A1 * 9/2004 Dorian .................. B01L 3/5635
210/416.1
2004/0228770 A1 11/2004 Gandhi et al.
2006/0013725 A1 1/2006 Larsen
2006/0121624 A1 * 6/2006 Huang .................. B01L 3/0289
436/180
2008/0219890 A1 9/2008 Lawson et al.
2008/0308422 A1 * 12/2008 Smith .............. G01N 27/44704
204/450
2009/0301231 A1 * 12/2009 Wang ........................ B41J 2/175
73/864.11
2009/0305337 A1 12/2009 Iqbal et al.
2010/0240022 A1 9/2010 Mcneely
2010/0317093 A1 * 12/2010 Turewicz ................ B01L 3/505
204/600
2012/0101407 A1 * 4/2012 Chan ........................ G01N 1/10
600/576
2012/0276582 A1 11/2012 Ritzen et al.
2012/0329140 A1 12/2012 Iqbal et al.
2013/0208558 A1 8/2013 Pearcy et al.
2014/0033809 A1 2/2014 Bransky et al.
2014/0358036 A1 * 12/2014 Holmes ............ A61B 5/150343
600/575
2016/0199834 A1 7/2016 Bransky et al.
2017/0058245 A1 3/2017 Shah et al.
2017/0122846 A1 * 5/2017 Holmes ................ G01N 33/491
2017/0274376 A1 9/2017 Nobile et al.
2019/0277837 A1 9/2019 Ran et al.
2019/0293671 A1 * 9/2019 Barbero-Ortega ..... G01N 35/10
2020/0179932 A1 6/2020 Williams et al.
2020/0216840 A1 * 7/2020 Tanno .................. C12N 9/1252
2020/0316599 A1 10/2020 Shi et al.
2020/0400534 A1 12/2020 Shi et al.
2021/0172967 A1 * 6/2021 Begolo ............. B01L 3/502715
2022/0048031 A1 * 2/2022 Chiang ............. B01L 3/502784
2022/0170068 A1 * 6/2022 Noda ..................... G01N 21/11
2022/0305493 A1 9/2022 Knapp et al.
2023/0010400 A1 1/2023 Shine et al.

OTHER PUBLICATIONS

International Search Report for PCT/US2013/001499 dated Mar. 26, 2014.

* cited by examiner

PRODUCING A REAGENT ON-BOARD AN INSTRUMENT

CROSS-REFERENCE TO RELATED APPLICATION(S)

This application is a continuation of U.S. application Ser. No. 17/066,094, filed Oct. 8, 2020, which is a continuation-in-part of U.S. application Ser. No. 14/653,956, filed on Jun. 19, 2015, which is the U.S. National Stage of International Application No. PCT/AU2013/001499, filed on Dec. 20, 2013, which claims the benefit of U.S. Provisional Application No. 61/745,331, filed Dec. 21, 2012, the disclosures of which are hereby incorporated by reference in their entirety.

FIELD OF THE INVENTION

The present invention relates broadly to producing a reagent on-board an instrument such as a laboratory instrument for treating a biological tissue sample with the reagent. The invention also relates generally to an instrument utilising a reagent produced on-board the instrument from a mixture of a concentrate and a diluent.

BACKGROUND TO THE INVENTION

Immunohistochemical staining and in situ nucleic acid analysis are tools used in histological diagnosis and the study of tissue morphology. Immunohistochemical staining relies on the specific binding affinity of antibodies with epitopes in tissue samples, and the increasing availability of antibodies which bind specifically with unique epitopes present only in certain types of diseased cellular tissue. Immunohistochemical staining involves a series of treatment steps conducted on a tissue sample (typically a section) mounted on a glass slide to highlight, by selective staining, certain morphological indicators of disease states.

Typical treatment steps include pretreatment of the tissue sample to reduce non-specific binding, antibody treatment and incubation, enzyme labelled secondary antibody treatment and incubation, substrate reaction with the enzyme to produce a fluorophore or chromophore highlighting areas of the tissue sample having epitopes binding with the antibody, counterstaining, and the like. Between each treatment step, the tissue sample must be rinsed to remove unreacted residual reagent from the prior step. Most treatment steps involve a period of incubation typically conducted at ambient temperature of around 25° C. up to around 40° C., while cell conditioning steps are typically conducted at somewhat higher temperatures, e.g. 90° C. to 100° C. In-situ DNA analysis relies upon the specific binding affinity of probes (DNA binding proteins) with unique nucleotide sequences in cell or tissue samples and similarly involves a series of process steps, with a variety of reagents and process temperature requirements. Some specific reactions involve temperatures up to 120° C. to 130° C.

In these various treatment steps it is understood that no single concentration of antibody is sufficient to account for tissue variations, processing variability and tissue sample thickness. Reagents are provided in a Ready to Use (RTU) format that cannot be varied in concentration. Alternatively, concentrates are supplied and diluted to achieve a range of staining options. However, these approaches do not address increasing customer need for workflow flexibility with ease of reagent uses.

SUMMARY OF THE INVENTION

According to a first aspect of the invention there is provided an instrument utilizing a reagent, said instrument providing on-board mixing of the reagent and including:

- a probe for dispensing said reagent;
- a concentrate chamber adapted to contain a concentrate; and
- a diluent chamber adapted to contain a diluent;
- wherein the probe includes an in-line mixing chamber adapted to receive the concentrate and the diluent to provide the reagent at the required concentration for dispensing by the probe.

The instrument may include one or more mixing wells located on the instrument and configured to receive the concentrate and the diluent for mixing to provide the reagent at the required concentration. In one embodiment the mixing well is formed in a sample staining module (SSM) of the instrument. The mixing well may be formed in a fixed or disposable cover member of the SSM. Alternately the mixing well may be a dedicated mixing well formed integral with the instrument.

Preferably the mixing wells are located adjacent one another for serial dilution of the concentrate with the diluent.

The chamber may be a container supplied in a sealed condition and adapted to contain a predetermined volume of the concentrate. The sealed container may include a sealing membrane arranged to contain the concentrate and an inert gas. The sealing membrane may be designed to be at least partly removed or pierced and the container is sized for addition of diluent for mixing on-board the instrument to provide the reagent at the required concentration. Alternatively or additionally the chamber comprises a plurality of the sealed containers each adapted to contain a predetermined volume of the concentrate. In this embodiment the plurality of chambers are arranged as multiple reservoirs e.g. in a blister pack. In another embodiment the chamber is a disposable or reusable probe tip containing the concentrate and adapted to fit to a dispensing probe of the instrument.

- therein some embodiments, the instrument includes a concentrate dispenser for on-board provision of a reagent, said dispenser comprising packaging adapted to contain a plurality of concentrate capsules, the packaging configured to release each of the capsules for mixing with a diluent on-board the instrument to provide the reagent at the required concentration.

Preferably the packaging includes a stacked cartridge adapted to contain one or more columns of the plurality of concentrate capsules. In some embodiments two or more columns of the concentrate capsules are provided in the cartridge. More preferably the dispenser also comprises a reciprocating release operatively coupled to the stacked cartridge to release a lowermost of the column of capsules form the cartridge for mixing with the diluent on-board the instrument. Alternatively the packaging includes a cartridge reel adapted to contain a roll of the concentrate capsules retained in a concentrate tape configured to be dispensed from the cartridge reel. In this embodiment the concentrate tape includes two strips adhered to one another with the concentrate capsules sandwiched therebetween and adapted to be released from the concentrate tape.

Also described herein is an instrument utilising a reagent, said instrument including:

- a diluent chamber adapted to contain a diluent;
- a concentrate dispenser operatively coupled to the diluent chamber to dispense concentrate for mixing with the diluent on-board the instrument to produce the reagent at a required concentration.

the concentrate may be contained in dissolvable capsules designed to dissolve during mixing with the diluent to produce the reagent. In this embodiment the diluent is acidic or basic depending on the concentrate, and the dissolvable capsules are formed at least in part of a material which dissolves in the acidic or basic diluent.

The diluent chamber may be a vacuum chamber to which the concentrate dispenser is operatively coupled wherein the concentrate is dispensed into the vacuum chamber with the assistance of vacuum pressure applied to the diluent chamber. Alternatively the concentrate dispenser may include a plunger for dispensing of the concentrate into the diluent chamber, preferably via a non-return valve. Still alternatively the concentrate dispenser may include a frangible separator which cooperates with the diluent chamber wherein rupturing of the frangible separator effects dispensing of the concentrate to the diluent chamber.

Generally the instrument is a laboratory instrument and the reagent is a high value reagent such as a molecular probe such as a nucleic acid probe or an antibody (Ab) although that need not be the case and the reagent may be a bulk reagent such as a wash fluid or buffer which is formulated on-board the instrument from concentrate and diluent. The concentrate may be in any state such as a liquid, solid, or lyophilised state.

Also described herein is a method of producing a reagent on-board an instrument, said method including the steps of:

providing a concentrate at the instrument;

discharging the concentrate into a diluent provided at the instrument, or vice versa;

mixing the concentrate with the diluent on-board the instrument to provide the reagent at a required concentration.

In one embodiment the method may also comprise one or more subsequent steps of diluting the reagent with additional diluent to produce the required concentration.

Also described is packaging for use with an instrument in the on-board provision of a reagent, the packaging being adapted to contain a plurality of concentrate capsules, and configured to release each of the capsules for mixing with a diluent on-board the instrument to provide the reagent.

Also described is a container for use with an instrument in the on-board provision of a reagent, the container adapted to contain a predetermined volume of a concentrate for mixing with a diluent on-board the instrument to provide the reagent.

Also described is a cover member for use with an instrument in the on-board provision of a reagent, the cover member including a well being adapted to receive a concentrate for mixing with a diluent on-board the instrument to provide the reagent.

BRIEF DESCRIPTION OF THE DRAWINGS

In order to achieve a better understanding of the nature of the present invention a preferred embodiment of an instrument utilizing a reagent will now be described, by way of example only, with reference to the accompanying drawings in which:

FIG. 1A, FIG. 1B and FIG. 1C may be collectively considered as a FIG. 1.

FIG. 2A and FIG. 2B may be collectively considered as a FIG. 2.

FIG. 3A and FIG. 3B show side and top views respectively; FIG. 3A and FIG. 3B may be collectively considered as a FIG. 3.

FIG. 4A, FIG. 4B, FIG. 4C, and FIG. 4D may be collectively considered as a FIG. 4.

FIG. 5A shows the sealing membrane intact (left) and ruptured (right); FIG. 5A, FIG. 5B. and FIG. 5C may be collectively considered as a FIG. 5.

DETAILED DESCRIPTION

Figure 1A:
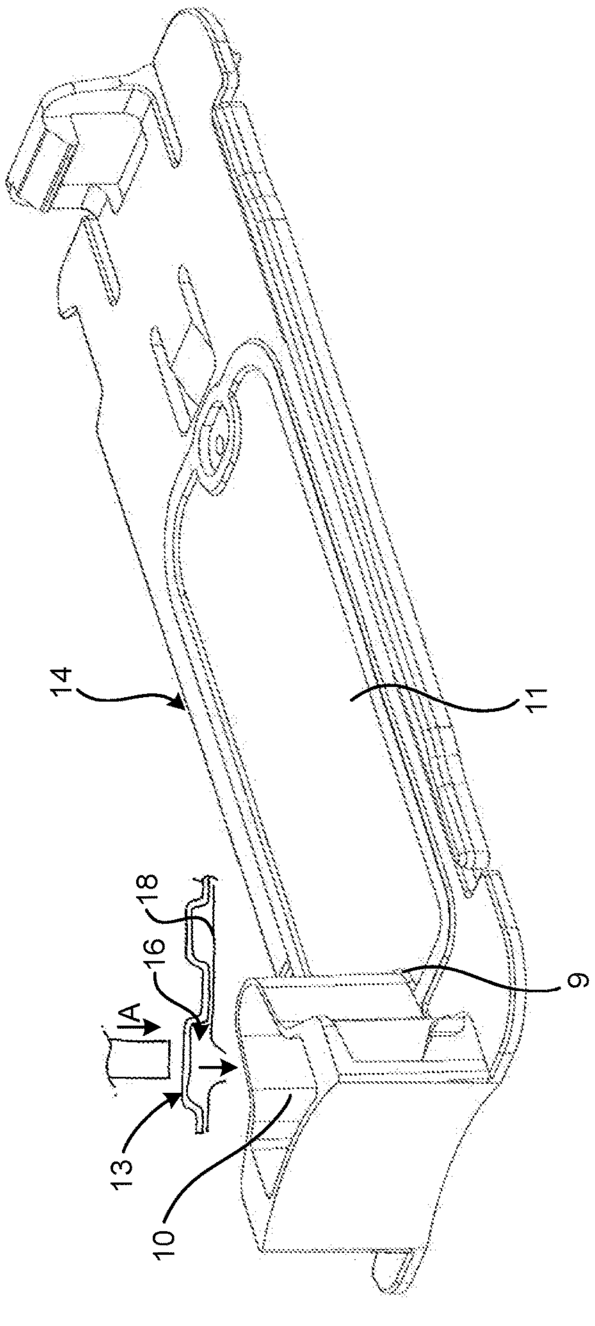
FIG. 1A is a schematic illustration of a cover member associated with a sample staining module (SSM) of an instrument having on-board production of the reagent according to an embodiment of one aspect of the invention.
Figure 2A:
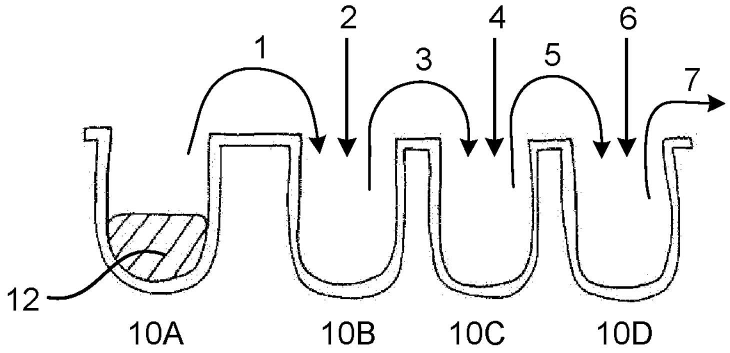
FIG. 2A and FIG. 2B are schematics of alternative embodiments of mixing wells or chambers designed for on-board production of reagents.
Figure 2B:
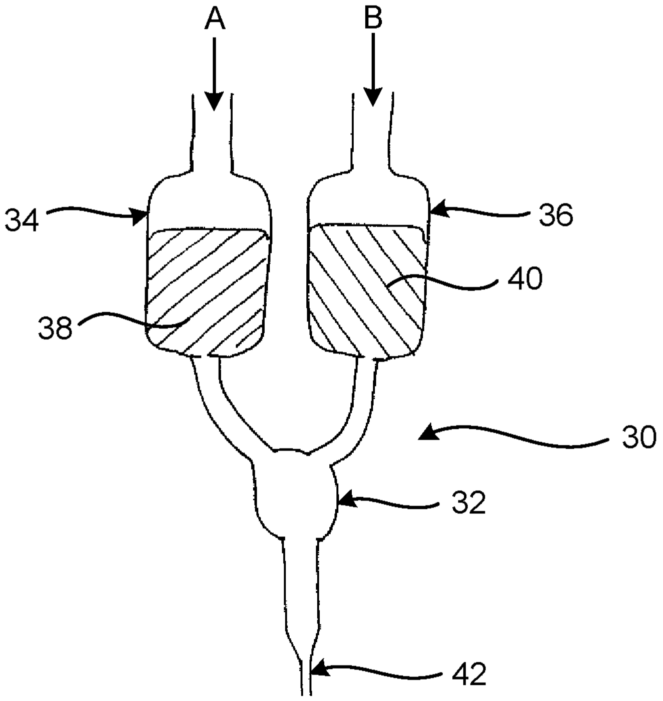
Figure 6:
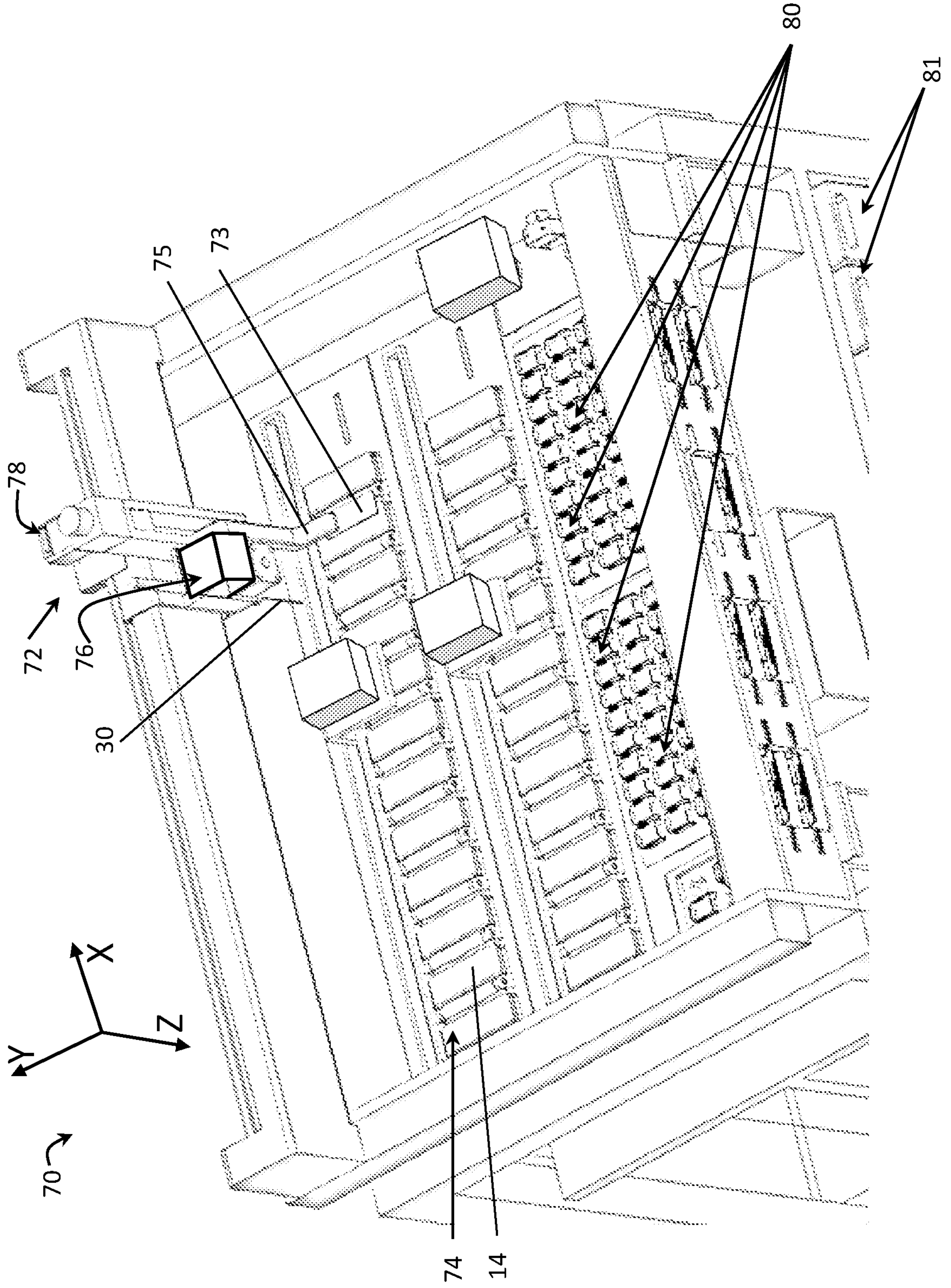
FIG. 6 is a schematic illustration of an instrument utilising a reagent and providing on-board mixing of the reagent according to embodiments of the invention.

FIG. 1A is a schematic illustration of a cover member 14 of a slide staining module (SSM) 74 of an instrument 70 (FIG. 6). In one embodiment, well 10 may be utilised as a mixing well for mixing a concentrate 12 with a diluent (not shown) on-board the instrument 70 to provide a reagent at a required concentration. The well 10 is in this embodiment formed in a cover member 14 associated with a sample staining module (SSM) 74 of the instrument 70 and may receive or mix reagent. The cover member 14 may be releasably attachable to the SSM 74 of the instrument 70. The mixing well in alternative embodiments may be formed as an integral part of the instrument. For example, in some embodiments, instrument 70 is provided with multiple mixing wells for serial dilution of the concentrate as illustrated in FIG. 2A. In other embodiments, the mixing well is a mixing chamber which is integral with a reagent dispensing probe 30 of the instrument, as illustrated in FIG. 2B.

The instrument 70 of this aspect of the invention is a laboratory instrument for treating a biological tissue sample within the SSM with the reagent, typically a high value reagent in the form of a molecular probe such as a nucleic acid probe or an antibody (Ab). The high value reagent is produced at a desired concentration on-board the instrument 70 by mixing the concentrate such as 12 and diluent to provide the reagent at the required concentration. It is to be understood, however, that the reagent need not be "high value" and may be any concentrate that is amenable to dilution to a required concentration such as, for example, wash fluid or buffer solution which may be diluted with for example, deionised water, to a predetermined concentration suitable for e.g. treatment of the sample or washing or other use within a cover member of the SSM.

FIG. 6 is a schematic illustration of an instrument 70 according to some embodiments of the invention, including a plurality of side staining modules 74 arranged to receive slides 73. At least one slide transport robot 78 in the form of a gantry robot configured by a controller (not shown) moves the slides 73 using a slide transport device 75 (such as a suction cup) to and from the slide staining modules 74. The fluid transport system 72 includes a fluid dispensing robot 76 configured by the controller to dispense a plurality of reagents from a probe 30 of the fluid dispensing robot to the slides 73 received in the slide treatment modules 74 to treat the tissue samples on the slides.

In some cases, to treat the tissue samples on the slides 73, a designated combination of reagents, e.g. higher and lesser value reagents, are required to be dispensed to a slide and in some embodiments it is desirable to achieve mixing to a predetermined concentration on-board the instrument. The fluid dispensing robot 76 is configured by the controller to dispense a plurality of reagents stored in reagent containers 80, 81 on board the instrument to the slides 73 in the slide staining modules 74.

Figure 1B:
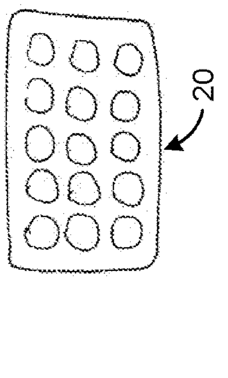
FIG. 1B and FIG. 1C show a concentrate packaged in a sealed container for dispensing into the cover member of FIG. 1A.
Figure 1C:
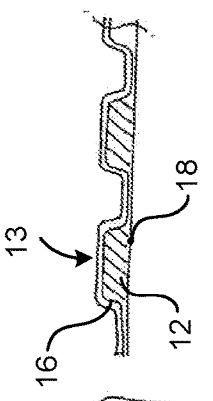

In the embodiment of FIG. 1B and FIG. 1C the concentrate 12 is provided in a sealed container 13. The sealed container 13 includes a sealing membrane 18 arranged to contain the concentrate 12 within a plurality of sealed chambers 16. The sealed container 13 of this example is in the form of a blister pack 20. The blister pack 20 is designed to release each of the concentrate volumes such as 12 into a chamber such as a concentrate chamber or a mixing chamber for on-board mixing of the reagent. In the context of FIG. 1A, each of the concentrate volumes such as 12 is released into the well 10 of the cover member 14. The sealing membrane 18 which is in the form of a frangible foil is ruptured or otherwise broken or removed by the instrument across an entry to the well 10 (or instrument chamber) for release of the concentrate 12. In this and other embodiments, the diluent may be pumped from a bulk supply into the well 10 either before or after addition of the concentrate to achieve the required concentration. The reagent is thus mixed and produced on-board the instrument for dispensing e.g. by a probe to cover member 14. The reagent may then be drawn under the cover member 14 or aspirated using a robot and a fluid transport probe (not shown) and then dispensed through a port 9 into a reaction area 11 for treatment, such as staining.

FIG. 2A and FIG. 2B illustrate alternative embodiments suitable for production of a reagent on-board an instrument such as that including the cover member 14 of the previous embodiment of FIG. 1A. For ease of reference and to avoid repetition, the same reference numerals have been used for similar components of this and any other embodiments. In the embodiment of FIG. 2A the instrument 70 is provided with multiple mixing wells 10A to 10D for serial dilution of the concentrate 12. The reagent 12 is at stage 1 transferred to the mixing well 10B and at stage 2 diluted with diluent. The resulting reagent is mixed in the mixing well 10B and at stage 3 transferred to mixing well 10C for further dilution at stage 4 with diluent. The resulting reagent is mixed in mixing well 10C and at stage 5 transferred to mixing well 10D for further dilution with diluent at stage 6. The final reagent at its required concentration is at stage 7 transferred from the mixing well 10D for use by the instrument 70. It will be appreciated by those skilled in the art that the number of mixing wells required for each desired dilution may vary according to the required dilution. Accordingly, the number of mixing wells provided or utilized may vary according to the required dilution. The final reagent may for example be used in staining a tissue sample located on a slide (not shown) of the SSM 74. The multiple mixing wells 10A to 10D may be formed as an integral part of the instrument 70 in for example the SSM 74 or as shown in FIG. 1A fabricated in a fixed or disposable cover member of the SSM.

In the embodiment of FIG. 2B the instrument 70 includes a probe 30 having an in-line mixing chamber 32 to provide on-board production of a reagent. The probe 30 is for example in the form of a fluid transfer probe (FTP) of an instrument used for dispensing fluids for treating or staining tissue samples on slides in the SSM 74. The modified FTP 30 includes a bifurcation to a diluent chamber 34 and a concentrate chamber 36 located up stream of the mixing chamber 32. The diluent and concentrate chambers 34/36 provide the requisite volume of diluent 38 and concentrate 40 to the mixing chamber 32 to provide a reagent at the required concentration. The FTP 30 includes a nozzle 42 downstream of the mixing chamber 32 which is configured to dispense the mixed reagent into a cover member 14 of a SSM 74. The nozzle 42 may discharge reagent directly on to the sample slide or into a port or well of a cover member 14 (see FIG. 1A) associated with the SSM. In one embodiment the instrument may incorporate a separate valve or valves (not shown) arranged on or adjacent to the mixing chamber 32. It is to be understood that the mixing chamber 32 may be in fluid communication with further concentrate and diluent reservoirs (80, 81) and optionally, further concentrate and diluent chambers (36, 34) upstream of the mixing chamber 32 such that the probe receives more than two constituents for mixing, enabling flexibility in the combinations and concentrations of reagents that are prepared on-board the instrument 70 as may be determined by a controller of the instrument. The concentrate reservoirs 80 may be e.g. in the form of sealed containers as disclosed herein.

Figure 7:
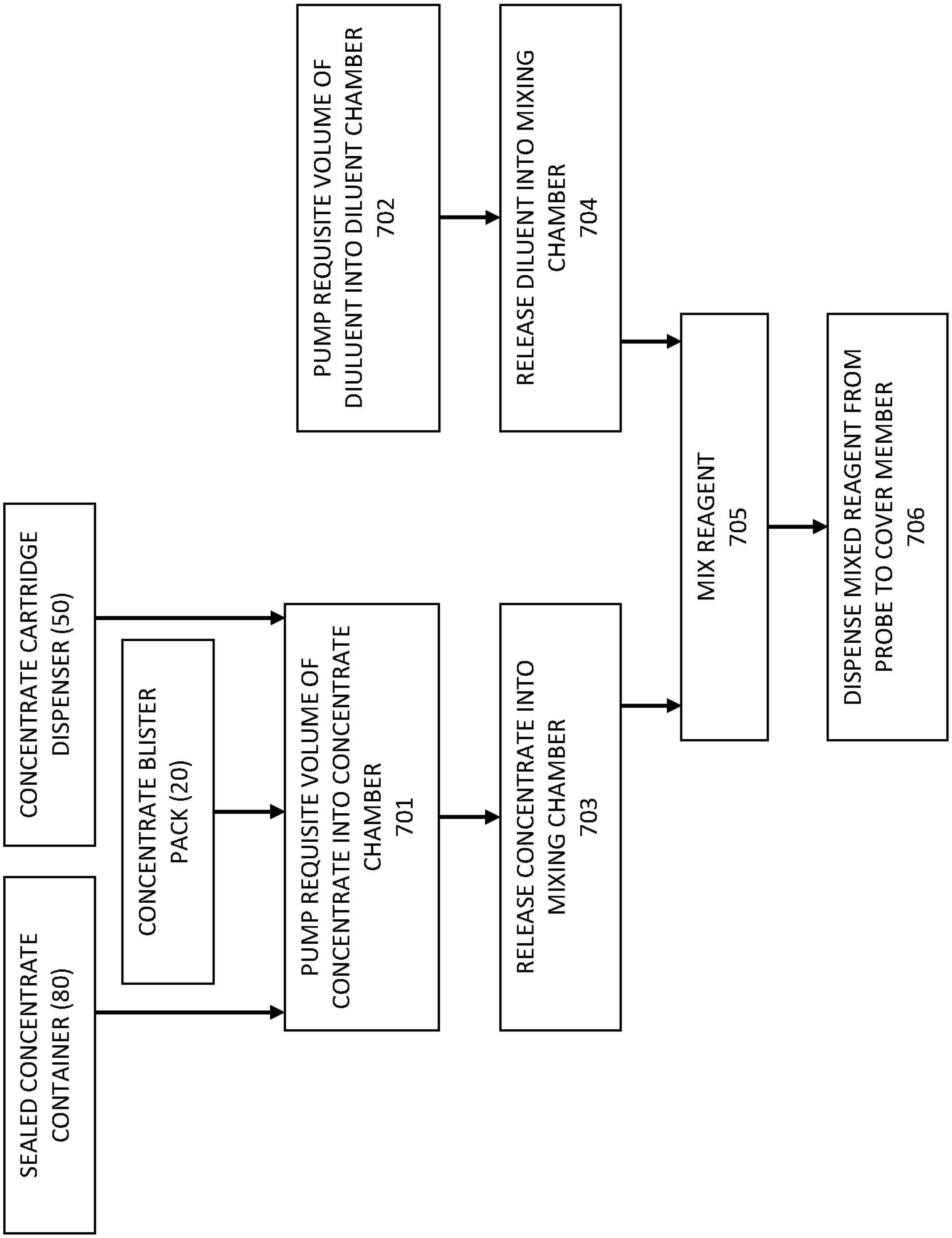
FIG. 7 is a flow diagram showing steps in a method of producing reagent onboard an instrument according to embodiments of the invention.

FIG. 7 is a flow chart illustrating steps in a method of producing a reagent on-board the instrument. The method includes, in a step 701, pumping a requisite volume of concentrate into the concentrate chamber and, in a step 702, pumping a requisite volume of diluent into the diluent chamber to achieve a required concentrate of reagent. In steps 703 and 704, the concentrate is released from the concentrate chamber and the diluent chamber respectively into the mixing chamber in the probe. In a step 705, the reagent is mixed at the required concentration, and in a step 706, the mixed reagent is dispensed from the probe to the cover member. It is to be understood that the instrument controller may be configured to implement the preferred method of on-board mixing of reagents by controlling operation of the fluid transport system 72 including the fluid dispensing robot 76 and pumping of concentrate 40 and diluent 38 from containers 80, 81 respectively, into the mixing chamber 32 either directly, or through concentrate and diluent chambers 36, 34 located in the probe 30 upstream of the mixing chamber as is shown in FIG. 7.

FIG. 7 also shows various instrument features 80, 20, 50 and 81, for storing and delivering concentrate and diluent for mixing of reagent on board the instrument.

Figure 3A:
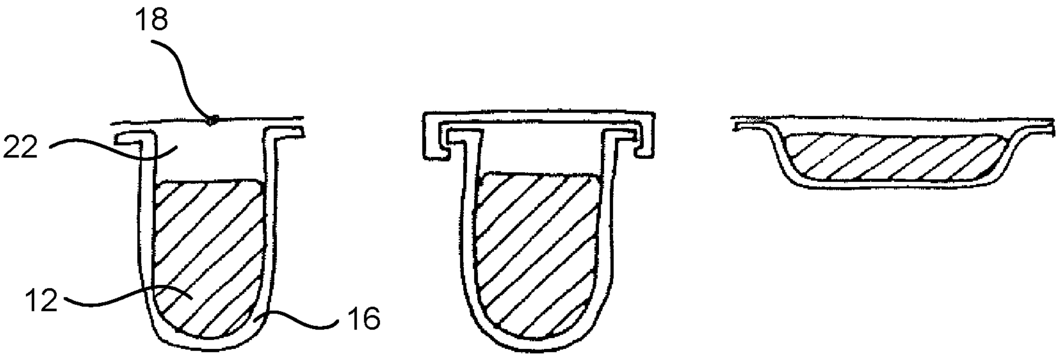
FIG. 3A and FIG. 3B are schematics of alternative embodiments of chambers designed to be used in conjunction with the instrument described with respect to FIG. 1A.
Figure 3B:
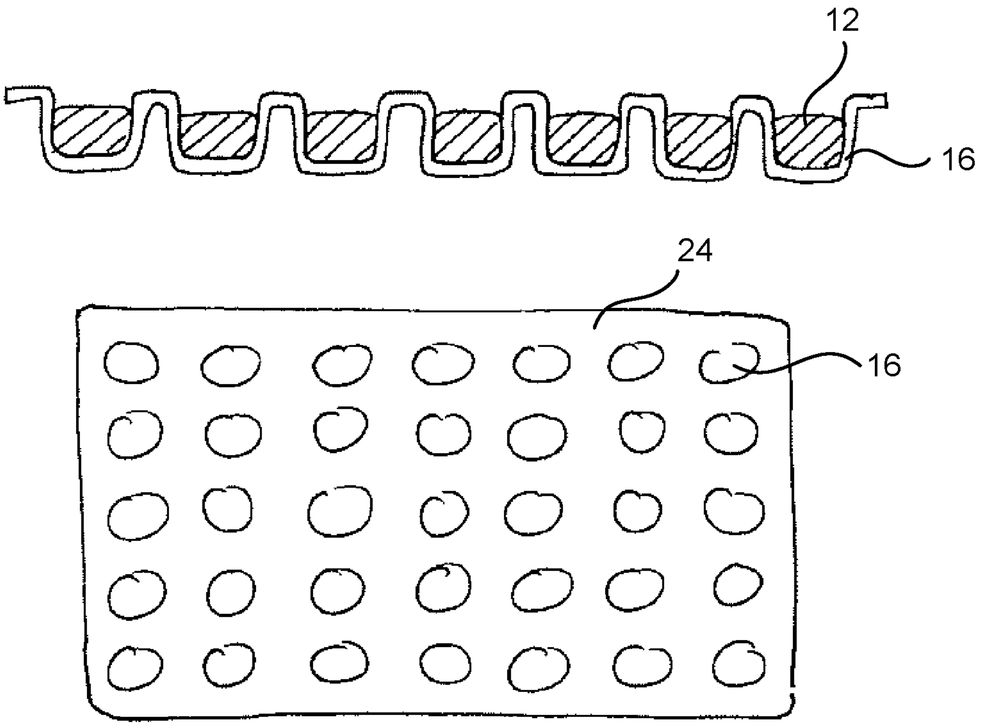

FIG. 3A and FIG. 3B are alternate embodiments and views of a chamber or concentrate container suitable for use with an instrument providing on-board production of a reagent. The chambers may for example be suitable for use with the cover member 14 of the instrument of FIG. 1A, or to supply the mixing wells or mixing chambers of FIGS. 2A and 2B. In the various embodiments of FIG. 3A the concentrate such as 12 is contained in a chamber 16 which is sealed with a sealing membrane 18. The concentrate 12 is protected from evaporation and oxidation by the use of nitrogen or other inert gases 22 sealed within the chamber 16. The sealing membrane 18 may be in the form of a foil pack or lid seal. The embodiment of FIG. 3B is similar to the blister pack 20 of FIG. 1B having multiple chambers such as 16 in a common base plate 24. Although not shown the multiple chambers 16 may also be sealed with a common sealing membrane or foil.

Figure 4A:
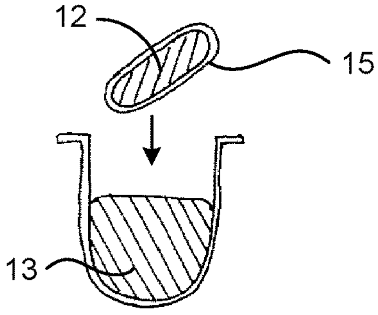
FIG. 4A, FIG. 4B, FIG. 4C, and FIG. 4D are schematics of different concentrate dispensers designed for the on-board provision of a reagent at an instrument according to embodiments of another aspect of the invention.

FIG. 4A, FIG. 4B, FIG. 4C, and FIG. 4D illustrate different embodiments of a concentrate dispenser for use on-board an instrument in production of a reagent, for example the reagent being used in staining or otherwise treating tissue samples in an SSM of the instrument. The embodiment of FIG. 4A schematically depicts mixing of a concentrate 12 with a diluent 13 to provide the reagent as may be achieved using mixing wells and mixing chambers on-board the instrument, according to various embodiments disclosed herein. The concentrate 12 is in this embodiment is contained in a dissolving capsule 15 designed to dissolve during mixing with the diluent 13. The diluent 13 may be acidic or basic depending on the chemistry of the concentrate, and the capsule 15 formed of a material which dissolves in the diluent 13. The diluent 13 may be contained in a mixing well associated with a cover member 14 of the SSM in FIG. 1A, or a mixing well, diluent chamber or mixing chamber of the instrument as illustrated in FIG. 2A and FIG. 2B.

Figure 4B:
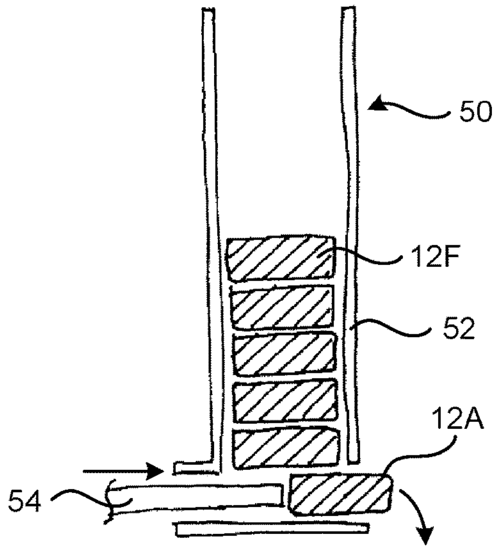
Figure 4C:
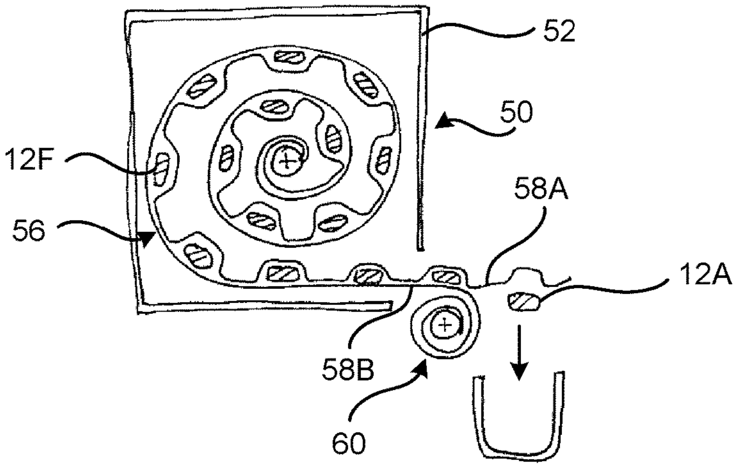

In the embodiments of FIG. 4B and FIG. 4C, the concentrate such as 12 is contained in a concentrate dispenser 50 operatively coupled to an instrument for on-board provision of a reagent. The concentrate dispenser 50 includes packaging 52 within which one of a plurality of the concentrate capsules such as 12A to 12F are contained in a stacked cartridge. The stacked cartridge packaging 52 is designed to release each of the capsules such as 12A for mixing with a diluent on-board the instrument to provide a reagent at the required concentration. In the embodiment of FIG. 4B the concentrate dispenser 50 includes a reciprocating release 54 operatively coupled to the stacked cartridge 52 to release a lowermost of the column of capsules such as 12A.

In the embodiment of FIG. 4C, the packaging of the concentrate dispenser 50 is in the form of a cartridge reel 52 contained within the instrument. The cartridge reel contains a roll of the concentrate capsules such as 12A to 12F retained in a concentrate tape 56 dispensed from the cartridge reel 52. The concentrate tape 56 includes two strips 58A and 58B adhered to one another with the concentrate capsules such as 12F sandwiched therebetween. The concentrate dispenser 50 of FIG. 4C also includes a spool 60 within the instrument for removing the lower strip 58B of the concentrate tape 56 to release each of the concentrate capsules such as 12A from the dispenser 50.

Figure 4D:
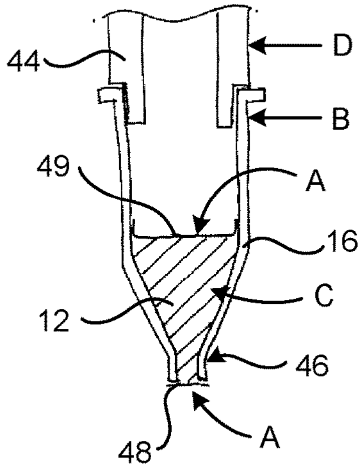

In the embodiment of FIG. 4D the instrument includes a chamber 16 in the form of a disposable or reusable probe tip containing the concentrate 12. The probe tip 16 is designed to fit to a probe such as 44 of the concentrate dispenser. The probe may for example be in the form of a FTP of an instrument used in treating or staining tissue samples. In this case the probe tip 16 includes a nozzle 46 designed to cooperate with a port of for example a cover member of a SSM. The nozzle 46 includes a temporary seal 48 which is designed to rupture on discharge of the concentrate 12 into the well for mixing with the diluent. The concentrate 12 may also be sealed in the probe tip 16 with another seal 49 which is similarly ruptured under the application of pressure applied by the FTP 44.

Figure 5A:
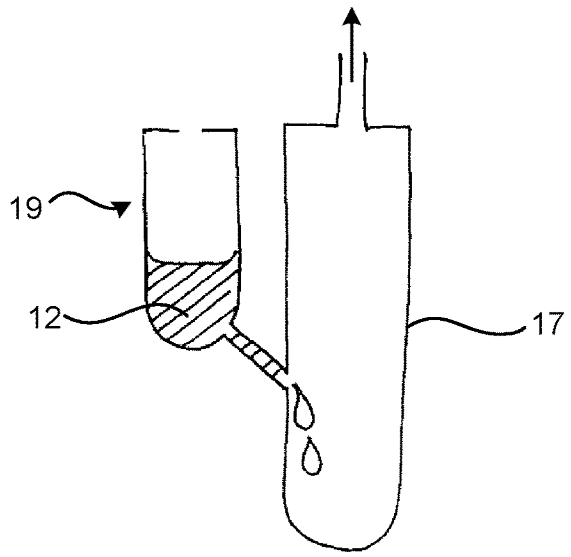
FIG. 5A, FIG. 5B, and FIG. 5C are schematics of packaged concentrates/diluents used to produce reagents on-board an instrument according to embodiments of a further aspect of the invention.
Figure 5B:
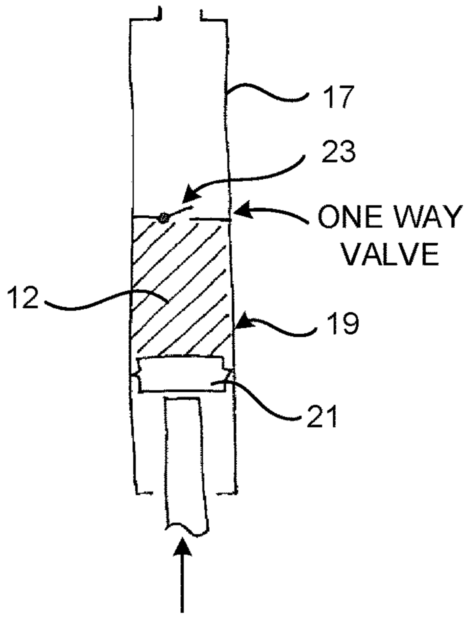
Figure 5C:
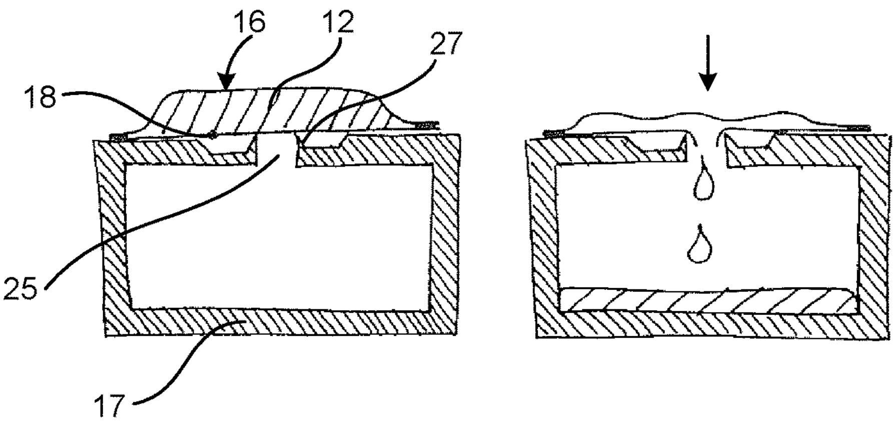

FIG. 5A, FIG. 5B, and FIG. 5C illustrate various embodiments of a diluent chamber 17 operatively coupled to a concentrate dispenser 19 for mixing on-board an instrument to produce a reagent. The diluent chamber is in the form of a mixing vial 17 with the concentrate dispenser 19 attached as a single package. In the embodiment of FIG. 5A the diluent vial 17 has a vacuum pressure applied to it for dispensing of the concentrate 12 from the concentrate dispenser 19. In the embodiment of FIG. 5B the concentrate dispenser 19 includes a plunger 21 for urging the concentrate 12 from the concentrate dispenser 19 into the diluent vial 17. The concentrate dispenser 19 may include a one way valve 23 through which the concentrate 12 is discharged into the diluent vial 17. The embodiment of FIG. 5C includes a concentrate dispenser in the form of the packaged chamber 16 such as the embodiments of FIG. 3A. The chamber 16 is operatively coupled to the diluent chamber or vial 17 with its sealing membrane 18 in contact with an entrance 25 to the diluent chamber 17. The entrance 25 includes a spiked ridge 27 designed on the application of downward pressure to the chamber 16 to rupture the frangible sealing membrane 18. The concentrate 12 is thus discharged into the diluent chamber 17 for mixing to produce the necessary reagent.

It will be readily understood by those skilled in the art that a concentrate includes liquids of varying concentrations and for example includes high-value reagents and bulk reagents. The FTP of the earlier embodiment may thus extend to dispensing a reagent to be diluted, a diluent, other reagents, or a combination of these liquids.

The instrument according to various embodiments includes a controller configured to implement the preferred method of producing a reagent on-board the instrument. The method may be implemented via computer program code including instructions to control movement of a concentrate dispenser in, for example, dispensing a concentrate to a well of a cover member associated with a SSM as in FIG. 1A, or a mixing well, diluent chamber or mixing chamber of the instrument as illustrated in FIGS. 2A and 2B. The controller may also control dilution and mixing of the concentrate with a diluent to provide the reagent at the required concentration.

Now that several preferred embodiments of the invention have been described it will be apparent to those skilled in the art that the method of producing a reagent on-board an instrument together with the concentrate dispenser and associated packaging has at least the following advantages:

1. The concentration of the reagent produced on-board the instrument can be varied, for example, to achieve the required staining option for tissue samples;
2. The ability to produce reagents on-board an instrument increase workflow flexibility with ease of use, for example by controlling the parameters of the dilution based on the supplied concentrate errors in staining are reduced;
3. On-board dilution lends itself to reagents in a liquid, solid and lyophilised form;
4. On-board dilution improves laboratory workflow without having to pre-dilute reagents from concentrates and also reduces operator time and potential errors.

Those skilled in the art will appreciate that the invention described herein is susceptible to variations and modifications other than those specifically described. All such variations and modifications are to be considered within the scope of the present invention the nature of which is to be determined from the foregoing description.

Future patent applications may be filed in the United States of America on the basis of or claiming priority from the present application. It is to be understood that the following claims are provided by way of example only, and are not intended to limit the scope of what may be claimed in any such future application. Features may be added to or omitted from the claims at a later date so as to further define or re-define the invention or inventions.

The invention claimed is:

1. A method of producing a reagent, the method comprising:

pumping a first volume of concentrate from a concentrate reservoir into a concentrate chamber of a fluid transfer probe of a staining instrument;

pumping a second volume of diluent from a diluent reservoir into a diluent chamber of the fluid transfer probe;

releasing the first volume of concentrate from the concentrate chamber and into a mixing chamber of the fluid-transfer probe;

releasing the second volume of diluent from the diluent chamber and into the mixing chamber of the fluid-transfer probe;

mixing the first volume of concentrate and the second volume of diluent in the mixing chamber to generate diluted concentrate; and dispensing a third volume of the diluted concentrate to a well of a cover member for a slide on the staining instrument.

2. The method of claim 1, wherein dispensing the third volume of the diluted concentrate comprises:

positioning the well of the cover member of the slide adjacent to a nozzle of the fluid transfer probe, the nozzle fluidly connected to the mixing chamber; and flowing the third volume of diluted concentrate from the mixing chamber through the nozzle and into the well of the cover member.

3. The method of claim 2, wherein positioning the well of the cover member comprises moving the slide using a slide transport robot.

4. The method of claim 2, and further comprising flowing diluted concentrate from the well through a port to a reaction area defined by the cover member and the slide.

5. The method of claim 4, and further comprising staining a tissue sample on the slide with the diluted concentrate.

6. The method of claim 1, wherein the third volume is equal to a sum of the first volume and the second volume.

7. The method of claim 1, wherein the concentrate reservoir is disposed on a body of the staining instrument.

8. The method of claim 1, wherein the diluent reservoir is disposed on a body of the staining instrument.

9. The method of claim 1, wherein dispensing the third volume is performed using a fluid dispensing robot to dispense the third volume of the diluted concentrate from the fluid transfer probe.

10. The method of claim 1, wherein:

the concentrate reservoir comprises a sealed concentrate container storing only the first volume of concentrate, and pumping the first volume of concentrate from the concentrate reservoir comprises releasing the first volume of concentrate from the sealed concentrate container into the concentrate chamber.

11. The method of claim 1, wherein: the concentrate reservoir comprises a concentrate blister pack having a plurality of sealed containers, each sealed container of the plurality of sealed containers of the concentrate blister pack storing only the first volume of concentrate, and pumping the first volume of concentrate from the concentrate reservoir comprises releasing the first volume of concentrate from one sealed container of the plurality of sealed containers of the blister pack into the concentrate chamber.

12. The method of claim 11, wherein releasing the first volume of concentrate comprises rupturing a sealing membrane of the one sealed container of the plurality of sealed containers of the blister pack.

13. The method of claim 1, wherein:

the concentrate reservoir comprises a concentrate cartridge dispenser configured to dispense concentrate cartridges, each concentrate cartridge of the concentrate cartridge dispenser includes only the first volume of concentrate, such that a single concentrate cartridge can be dispensed to provide the first volume of concentrate, and pumping the first volume of concentrate from the concentrate reservoir comprises dispensing, by the concentrate cartridge dispenser, one concentrate cartridge into the concentrate chamber.

14. The method of claim 13, wherein the single concentrate cartridge is a dissolvable capsule.

* * * * *